(12) United States Patent
Watson

(10) Patent No.: US 11,768,622 B2
(45) Date of Patent: Sep. 26, 2023

(54) DIFFERENTIAL SNAPSHOT WITHOUT ARRAY SUPPORT

(71) Applicant: EMC IP Holding Company LLC, Hopkinton, MA (US)

(72) Inventor: Thomas L. Watson, Richardson, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 17/107,229

(22) Filed: Nov. 30, 2020

(65) Prior Publication Data
US 2022/0171536 A1 Jun. 2, 2022

(51) Int. Cl.
G06F 3/06 (2006.01)
H04L 9/06 (2006.01)
G06F 21/60 (2013.01)

(52) U.S. Cl.
CPC .............. *G06F 3/065* (2013.01); *G06F 3/064* (2013.01); *G06F 3/067* (2013.01); *G06F 3/0619* (2013.01); *G06F 3/0644* (2013.01); *G06F 3/0647* (2013.01); *G06F 21/602* (2013.01); *H04L 9/0643* (2013.01)

(58) Field of Classification Search
CPC ........ G06F 3/065; G06F 3/0619; G06F 3/064; G06F 3/0644; G06F 3/0647; G06F 3/067; G06F 21/602; H04L 9/0643
See application file for complete search history.

(56) References Cited

U.S. PATENT DOCUMENTS

| | | | |
|---|---|---|---|
| 9,251,343 B1* | 2/2016 | Vincent | G06F 21/566 |
| 11,086,545 B1* | 8/2021 | Dayal | G06F 3/067 |
| 2007/0226730 A1* | 9/2007 | Coyle | G06F 16/289 |
| | | | 717/170 |
| 2007/0266037 A1* | 11/2007 | Terry | G11B 27/329 |
| 2010/0049930 A1* | 2/2010 | Pershin | G06F 11/1448 |
| | | | 711/E12.103 |
| 2015/0026132 A1* | 1/2015 | Arnaudov | G06F 16/128 |
| | | | 707/639 |
| 2018/0356989 A1* | 12/2018 | Meister | G06F 11/3409 |
| 2022/0131879 A1* | 4/2022 | Naik | H04L 63/1416 |

OTHER PUBLICATIONS

Raman Kumar, "Introducing Cost-Effective Increments Snapshot of Azure Managed Disks in Preview," Blog (/en-us/blog/) / Storage, Backup & Recovery (Jul. 17, 2020).

* cited by examiner

Primary Examiner — Ryan Bertram
Assistant Examiner — Eric T Loonan
(74) Attorney, Agent, or Firm — Ryan, Mason & Lewis, LLP (57) ABSTRACT

Methods, apparatus, and processor-readable storage media for implementing differential snapshots without array support are provided herein. An example computer-implemented method includes determining whether one or more of a plurality of data blocks in a first snapshot of a storage volume have changed relative to a plurality of data blocks in a second snapshot of the storage volume; generating a respective data structure for each of the plurality of data blocks in the first snapshot, wherein the data structure comprises data content of the corresponding data block of the first snapshot only if the corresponding data block has changed relative to the second snapshot; and transmitting the data structures to a remote storage system, wherein the remote storage system generates a copy of the first snapshot based at least in part on the data structures.

20 Claims, 7 Drawing Sheets

DIFFERENTIAL SNAPSHOT WITHOUT ARRAY SUPPORT

FIELD

The field relates generally to information processing systems, and more particularly to storage in such systems.

BACKGROUND

Data protection systems transmit volume snapshots from one location to a remote location. For example, the remote location may be a location where a backup copy of the volume resides. The size of these snapshots can be quite large (e.g., hundreds of gigabytes or more), and are often transmitted over a relatively low bandwidth link or an expensive metered link. Additionally, it is often beneficial to instantiate a snapshot in a relatively short amount of time, such as, for example, to avoid an application outage when migrating the application using the volume to the remote location.

SUMMARY

Illustrative embodiments of the disclosure provide differential snapshot techniques. An exemplary computer-implemented method includes determining whether one or more of a plurality of data blocks in a first snapshot of a storage volume have changed relative to a plurality of data blocks in a second snapshot of the storage volume; generating a respective data structure for each of the plurality of data blocks, wherein the data structure comprises data content of the corresponding data block of the first snapshot only if the corresponding data block has changed relative to the second snapshot; and transmitting the data structures to a remote storage system, wherein the remote storage system generates a copy of the first snapshot based at least in part on the data structures.

Illustrative embodiments can provide significant advantages relative to conventional capacity management techniques. For example, challenges associated with performing differential snapshots when a storage array does not externally expose a way of determining blocks that are different between two snapshots are overcome in one or more embodiments by efficiently selecting data blocks to be transmitted to a remote location so that the remote location can assemble a complete a copy of the snapshot.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
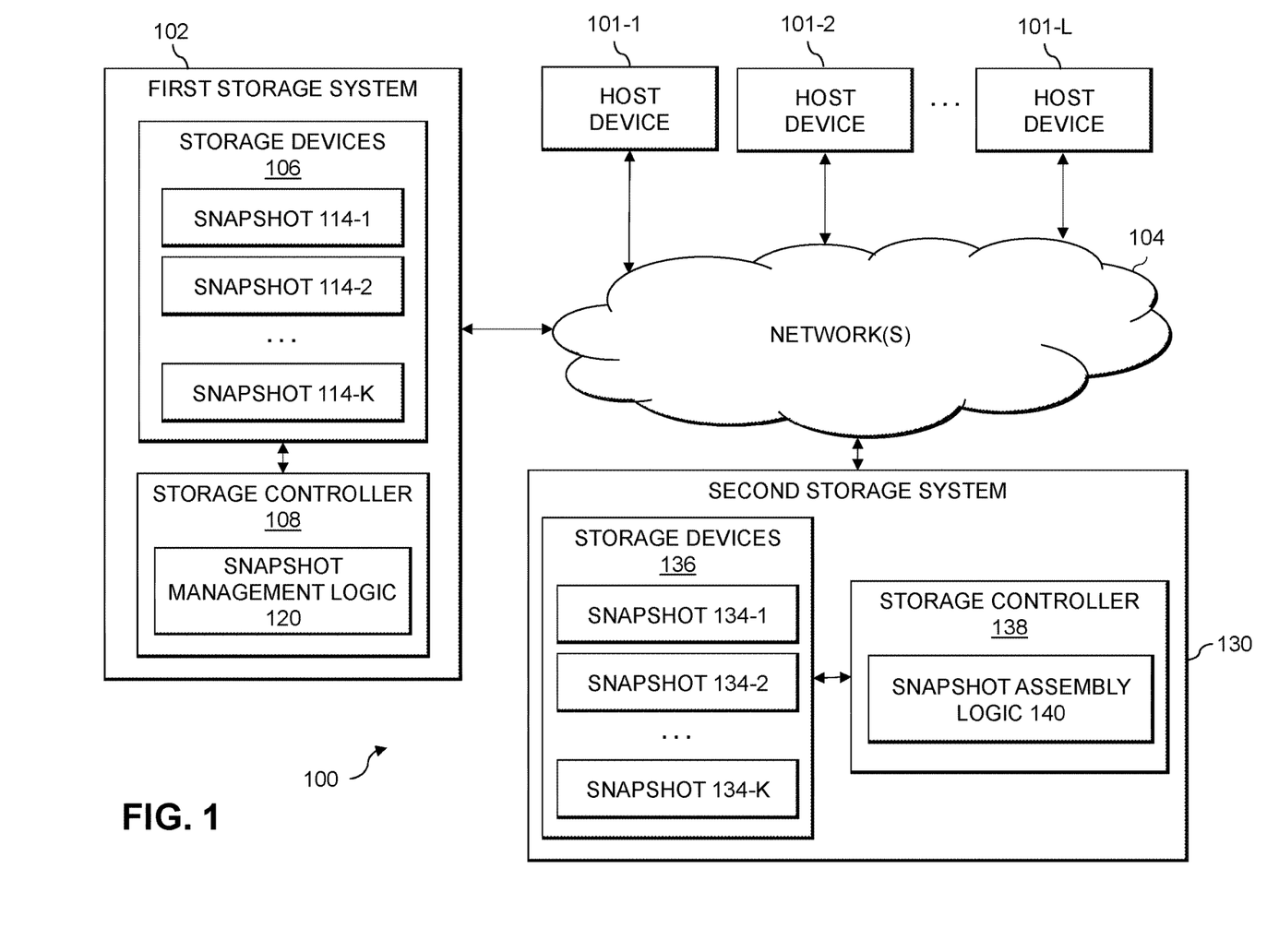
FIG. 1 shows an information processing system configured for differential snapshots in an illustrative embodiment.

FIG. 1 shows an information processing system 100 configured in accordance with an illustrative embodiment. The information processing system 100 comprises a plurality of host devices 101-1, 101-2, . . . 101-L, collectively referred to herein as host devices 101, and a first storage system 102. The host devices 101 are configured to communicate with the first storage system 102 over a network 104. Also, shown in FIG. 1 is a second storage system 130, which in at least some embodiments corresponds to a cloud storage system.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the first storage system 102. The term "input-output" as used herein refers to at least one of input and output. For example, IO operations may comprise write requests and/or read requests directed to logical addresses of a particular logical storage volume of the first storage system 102. These and other types of IO operations are also generally referred to herein as IO requests.

The first storage system 102 illustratively comprises processing devices of one or more processing platforms. For example, the first storage system 102 can comprise one or more processing devices each having a processor and a memory, possibly implementing virtual machines and/or containers, although numerous other configurations are possible.

The first storage system 102 can additionally or alternatively be part of a cloud infrastructure such as an Amazon Web Services (AWS) system. Other examples of cloud-based systems that can be used to provide at least portions of the first storage system 102 include Google Cloud Platform (GCP) and Microsoft Azure.

The host devices 101 and the first storage system 102 may be implemented on a common processing platform, or on separate processing platforms. The host devices 101 are illustratively configured to write data to and read data from the first storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage system 102 comprises a plurality of storage devices 106 and an associated storage controller 108. The storage devices 106 store data of a plurality of storage volumes. For example, the storage volumes may illustratively comprise respective logical units (LUNs) or other types of logical storage volumes. The term "storage volume" as used herein is intended to be broadly construed, and should not be viewed as being limited to any particular format or configuration.

The storage devices 106 of the first storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the first storage system 102.

It is therefore to be appreciated numerous different types of storage devices 106 can be used in first storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In the FIG. 1 embodiment, the storage devices 106 store a plurality of snapshots 114-1, 114-2, . . . 114-K. In at least some embodiments, the storage controller 108 comprises snapshot management logic 120. The snapshot management logic 120 of storage controller 108 may, at least in part, maintain and efficiently transfer the snapshots 114-1, 114-2, . . . 114-K to the second storage system 130 as described in more detail elsewhere herein.

In some embodiments, the first storage system 102 illustratively comprises a scale-out all-flash distributed content addressable storage (CAS) system, such as an XtremIO™ storage array from Dell Technologies. A wide variety of other types of distributed or non-distributed storage arrays can be used in implementing the first storage system 102 in other embodiments, including by way of example one or more VNX®, VMAX®, Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

In some embodiments, communications between the host devices 101 and the first storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the first storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the first storage system 102. Such interaction illustratively includes generating IO operations, such as write and read requests, and sending such requests over the network 104 for processing by the first storage system 102. In some embodiments, each of the host devices 101 comprises a multi-path input-output (MPIO) driver configured to control delivery of IO operations from the host device to the first storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the first storage system 102.

The MPIO driver may comprise, for example, an otherwise conventional MPIO driver, such as a PowerPath® driver from Dell Technologies. Other types of MPIO drivers from other driver vendors may be used.

The storage controller 108 of first storage system 102 in the FIG. 1 embodiment includes snapshot management logic 120. The storage controller 108 and the first storage system 102 may further include one or more additional modules and other components typically found in conventional implementations of storage controllers and storage systems, although such additional modules and other components are omitted from the figure for clarity and simplicity of illustration.

In some embodiments, the first storage system 102 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the first storage system 102 in such an embodiment collectively comprise at least a portion of the storage controller 108 of the first storage system 102. For example, in some embodiments the sets of processing modules of the storage nodes collectively comprise a distributed storage controller of the distributed first storage system 102. A "distributed storage system" as that term is broadly used herein is intended to encompass any storage system that, like the first storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of first storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The first storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the first storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the first storage system 102 to reside in different data centers. Numerous other distributed implementations of the host devices 101 and the first storage system 102 are possible.

In the FIG. 1 embodiment, the second storage system 130 includes a storage controller 138 and storage devices 136. As an example, storage controller 138 and storage devices 136 may be implemented in a similar manner as storage devices 106 and storage controller 108, respectively.

In the FIG. 1 embodiment, the storage controller 138 also includes snapshot assembly logic 140 that, at least in part, assembles snapshots 134-1, 134-2, . . . 134-K. The snapshots 134-1, 134-2, . . . 134-K may be considered copies of the snapshots 114-1, 114-2, . . . 114-K that are assembled based on data transferred from the first storage system 102, as described in more detail elsewhere herein. In at least one example embodiment, the first storage system 102 may relate to a local storage system (such as, for example, a NAS storage system), and the second storage system 130 may relate to one or more cloud storage systems (such as, for example, storage systems corresponding to Elastic Cloud Storage (ECS), GCP, AWS, and Microsoft Azure).

Additional examples of processing platforms utilized to implement host devices 101, first storage system 102, and second storage system 130 in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, first storage system 102, network 104, storage devices 106, storage controller 108, snapshot management logic 120, second storage system 130, storage devices 136, storage controller 138, and snapshot assembly logic 140 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing snapshot management logic 120 will be described in more detail with reference to the flow diagram of FIG. 5.

In some example embodiments, differential snapshots are taken of a volume in order to protect the data of that volume. These differential snapshots provide data protection for a volume of a storage system to account for frequent data changes in the volume. By way of example, a storage system may perform a snapshot of a volume at different points of time (e.g., periodically, scheduled, etc.) to generate a series of snapshots, and each snapshot in the series may be transferred to a remote storage location. If the remote storage location has a copy of an old snapshot and needs to instantiate a copy of new snapshot at the remote location, then the storage system can transmit just the differences (also referred to herein as "deltas") between the old snapshot and the new snapshot over a network link (e.g., a long haul network), rather than transmitting the new snapshot in its entirety. In this manner, the remote storage location may assemble a complete copy of the new snapshot by taking the contents of the old snapshot that it already has a copy of and applying the differences to the remote copy of the old snapshot.

Such embodiments are useful when a storage array does not externally expose a way of determining the blocks that are different between two snapshots. In situations when a storage array externally exposes a way of determining the blocks that are different (e.g., a bitmap with each bit having a 1 if a particular block is different and a 0 if the block is not different, a comparison of the hashes or the data blocks of the two snapshots is unnecessary, and the techniques described herein relating to the remote reassembly of the new snapshot are still helpful in such situations). These and other embodiments allow, for example, snapshots to be taken more frequently, which can translate into lower Recover Point Objective (RPO) times. RPO generally refers to the maximum age of the snapshot(s) that must be used to recover the application. Thus, decreasing the RPO times allows less data loss to occur.

Figure 2:
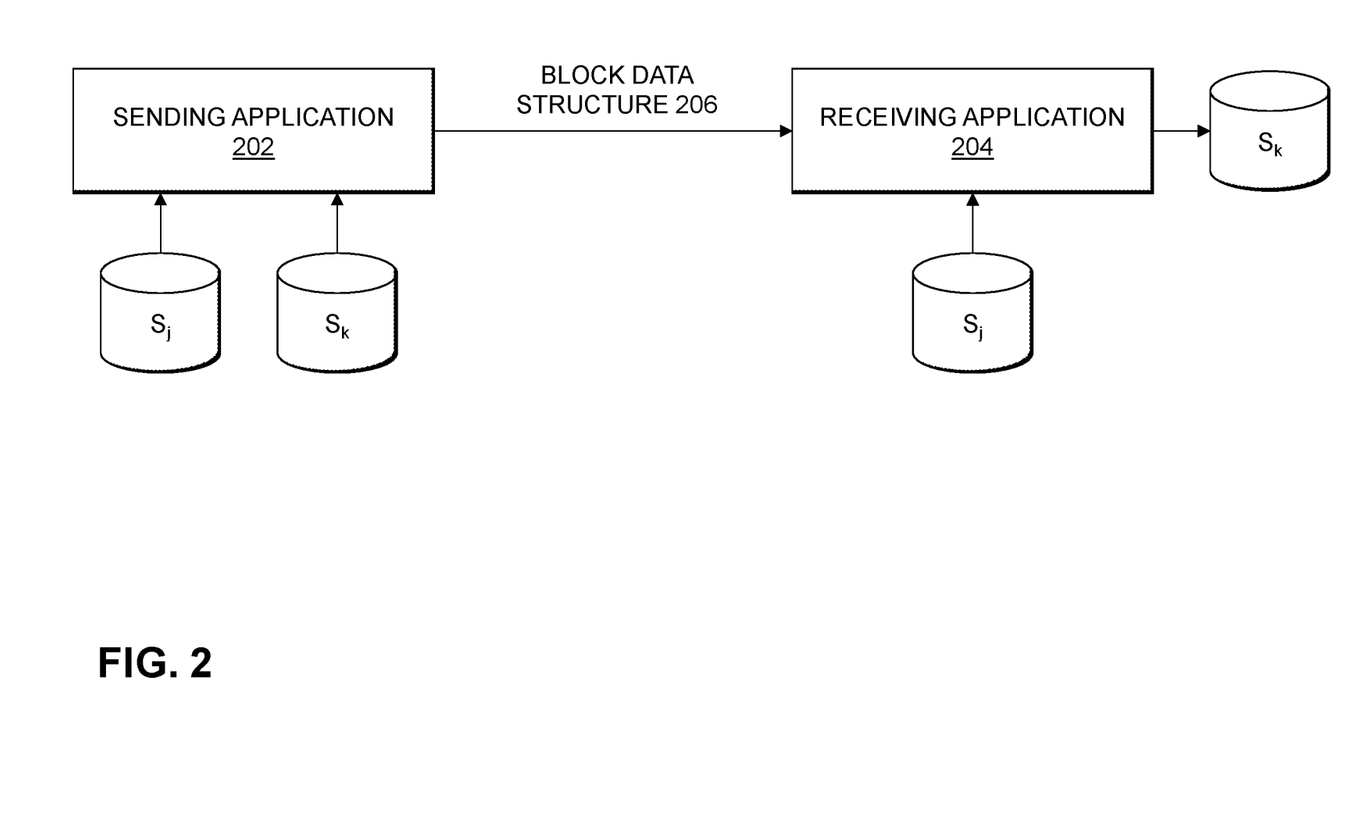
FIG. 2 shows a first differential snapshot architecture in an illustrative embodiment.

Referring now to FIG. 2, this figure shows a first differential snapshot architecture in accordance with an illustrative embodiment. The snapshot architecture in the FIG. 2 embodiment includes a sending application 202 (e.g., associated with the first storage system 102) and a receiving application 204 (associated with the second storage system 130). In this example, the sending application 202 obtains a first snapshot, $S_j$, and a second snapshot, $S_k$. It is assumed that $S_j$ was taken at an earlier time than $S_k$. It is also assumed that the receiving application 204 has previously assembled a copy of $S_j$. Each snapshot may be divided into logical blocks, which are normally of a fixed length (for example, 64 KB). The sending application 202 reads each corresponding block of $S_j$ and $S_k$, compares the blocks, and only sends the blocks that are different. In the FIG. 2 embodiment, each block is sent in the form of a block data structure 206. The block data structure 206 may include, for example, an offset field, a length field, a hash field, and a data field. In some example embodiments, the hash field may correspond to a checksum field.

As an example, the sending application 202 may read and compare the blocks from each of the snapshots $S_j$ and $S_k$. If the blocks are the same, a block data structure 206 is transmitted to the receiving application 204 with just the offset, length, and hash fields filled in, since it is assumed the receiving application 204 already has the data for this block because the block was the same. The length field for that block would be set to zero, indicating no data bytes were sent. According to at least one example embodiment, if a corresponding block is determined to be different between $S_j$ and $S_k$, then the entire block data structure 206 would be filled in, including the data array field, and transmitted to the receiving application 204. In this case, the length field indicates the number of bytes transmitted. The receiving application 204 generates (or assembles) a copy of $S_k$. In particular, the receiving application 204 examines the header received for each block, and based on the information in the header, copies the existing data for the block from the copy of $S_j$ to the copy of $S_k$, or copies the updated data received in the block data structure 206 into the copy of $S_k$.

Different algorithms may be used to populate the hash field. As a non-limiting example, a SHA-512 hash or another secure hash algorithm (SHA) may be used. More specifically, the SHA-512 algorithm generates a 64 byte hash result that may be used as a checksum. Generally, a checksum validates whether the data are delivered correctly from the sending application 202 to the receiving application 204. It is noted that if the block size is 4K bytes, then the SHA-512 algorithm generates a hash that is $\frac{1}{64}^{th}$ the size of the original data. If a larger block size is used, for example 64 KBs, then the checksum is $\frac{1}{1024}^{th}$ the size of the original data.

It is noted that the sending application 202 in the first differential snapshot architecture reads data from both $S_j$ and $S_k$. An improved algorithm that reduces the amount of data read is described in conjunction with the differential snapshot architecture shown in FIG. 3.

Figure 3:
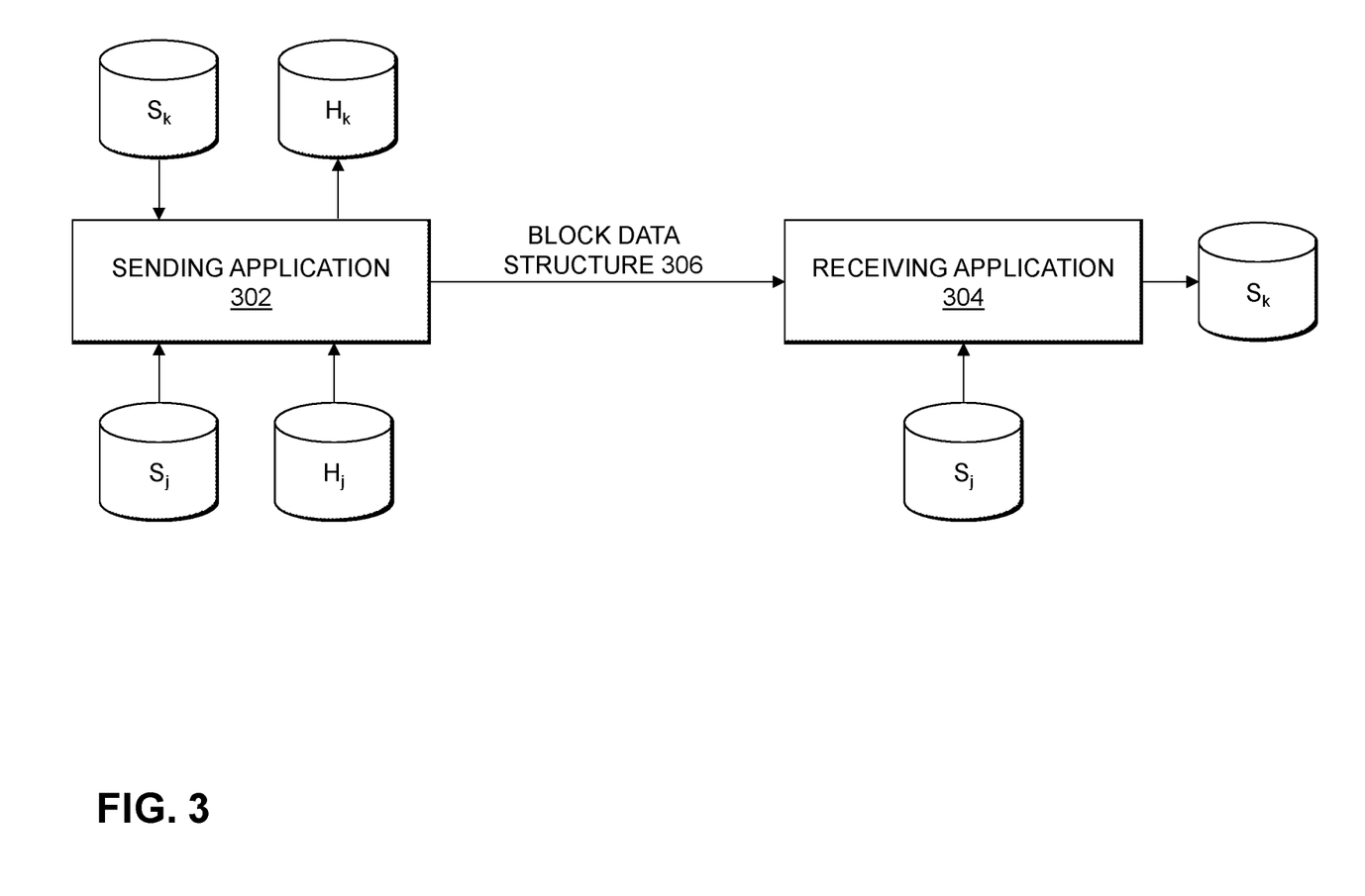
FIG. 3 shows a second differential snapshot architecture in an illustrative embodiment.

FIG. 3 shows a second differential snapshot architecture in accordance with an illustrative embodiment. Similar to FIG. 2, the architecture shown in FIG. 3 includes a sending application 302 (e.g., associated with the first storage system 102) that obtains a first snapshot, $S_j$, and a second snapshot, $S_k$, where $S_j$ was taken at an earlier time than $S_k$. FIG. 3 also shows a receiving application 304 (e.g., associated with the second storage system 130) which has previously assembled a copy of $S_j$. The sending application 302 saves block data headers that include respective hashes that are computed based on the corresponding data content in a hash file, denoted $H_j$. The data content itself is not saved on $H_j$. For example, as the sending application 302 is sending $S_j$ to the receiving application 304, it saves a copy of each header in a corresponding file $H_j$, wherein $H_j$ includes the hash (or checksum) of each block of $S_j$, without the data. This results in $H_j$ having a length that is significantly smaller than the length of $S_j$. For example, if a SHA-512 algorithm is used, then the length of $H_j$ is reduced by a ratio of approximately $1/64^{th}$ for a block size of 4K bytes, or by $1/1024^{th}$ 64 KBs for a block size of 64 KBs.

When the sending application 302 sends $S_k$ to the receiving application 304, it can more efficiently determine what to send, as described in more detail below in conjunction with FIG. 4.

Figure 4:
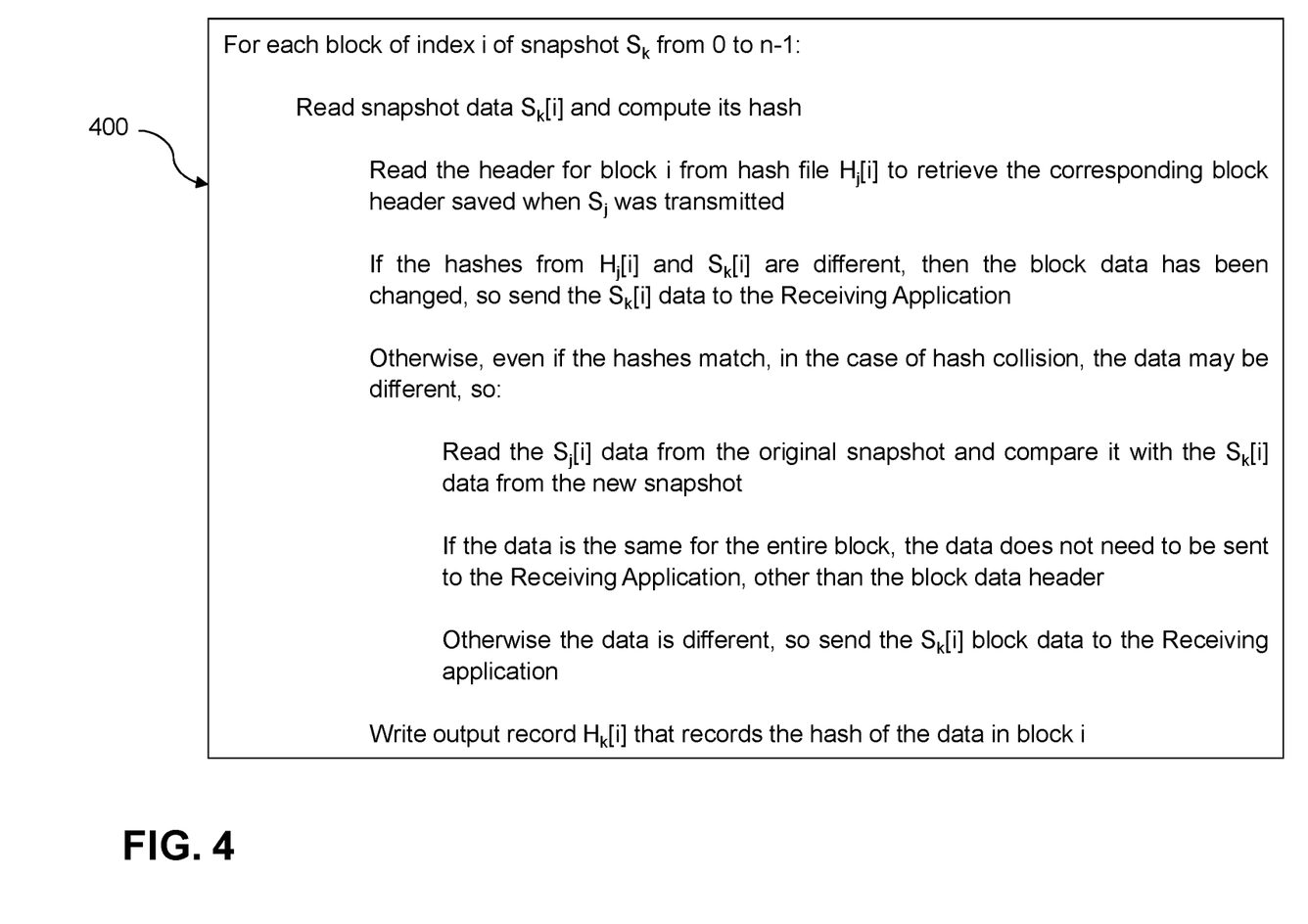
FIG. 4 shows an example of pseudocode for performing differential snapshots in an illustrative embodiment.

FIG. 4 shows example pseudocode 400 of an efficient differential snapshot algorithm in an illustrative embodiment. The example pseudocode 400 is representative of computer code that may be executed by or under the control of at least one processing system and/or device. For example, the example pseudocode 400 may be viewed as comprising a portion of a software implementation of at least part of the first storage system 102 of the FIG. 1 embodiment.

In the example pseudocode 400, for each block in $S_k$ having index i, wherein i is from 0 to n−1, the sending application 302 reads snapshot data $S_k[i]$ and computes its hash (e.g., using SHA-512). The sending application 302 then reads the header for block i from hash file $H_j[i]$ to retrieve the corresponding block header saved when $S_j$ was transmitted. If the hash from $H_j[i]$ is different than the hash computed for $S_k[i]$, then the block data has been changed, in which case the data corresponding to $S_k[i]$ are sent to the receiving application 304 using the block data structure 306.

Otherwise, even if the hashes from $H_j[i]$ and the hash computed for $S_k[i]$ are the same, in the case of hash collision, the data could be different. In this case, the sending application 302 reads the data from $S_j[i]$ and compares them with the data from $S_k[i]$. If the data are the same for the entire block, then the block data structure 306 may be sent without the corresponding data to the receiving application 304. If the data are different, the sending application 302 sends the block data structure 306 for the $S_k[i]$ block to the receiving application 304, including the corresponding data. Additionally, the sending application generates an output record $H_k[i]$ that records the hash of the data in block i.

It is noted that the sending application 302 reads every block of $S_k$ and compares it with the hash for that block in $H_j$. If the checksums are different, then the block $S_j$ may be sent immediately. Only if the checksums for a block are the same, the corresponding block of $S_j$ is read and compared with the block of $S_j$. If all bytes of the block are the same, then only a header is transmitted; otherwise the data in block in must be transmitted as we had a hash collision. This architecture results in a low overhead of additional reads if most of the data are changed and need to be transmitted. If most of the data are the same, the read overhead is around two times the amount of the algorithm described above in conjunction with FIG. 2, but even in this case no redundant data are transferred across the network, thereby saving network resources.

It is to be appreciated that the particular example pseudocode 400 shows just one example implementation of a portion of a differential snapshot algorithm, and alternative implementations of the process can be used in other embodiments.

In at least one embodiment, the data (e.g., the data array field of the block data struct) are encrypted between the sending application and the receiving application, which allows the data to be encrypted in transit. In such embodiments, a key pair is shared between the sending application and receiving application.

In one or more example embodiments, the data are compressed after determining which data must be sent. Such compression may be performed on a block-by-block basis, compressing only the data bytes; or the entire transmitted stream may be compressed from the sending application to the receiving application. Compression on a block-by-block basis allows for easier recovery in the event of network transmission errors as only the corrupted block needs to be retransmitted.

Figure 5:
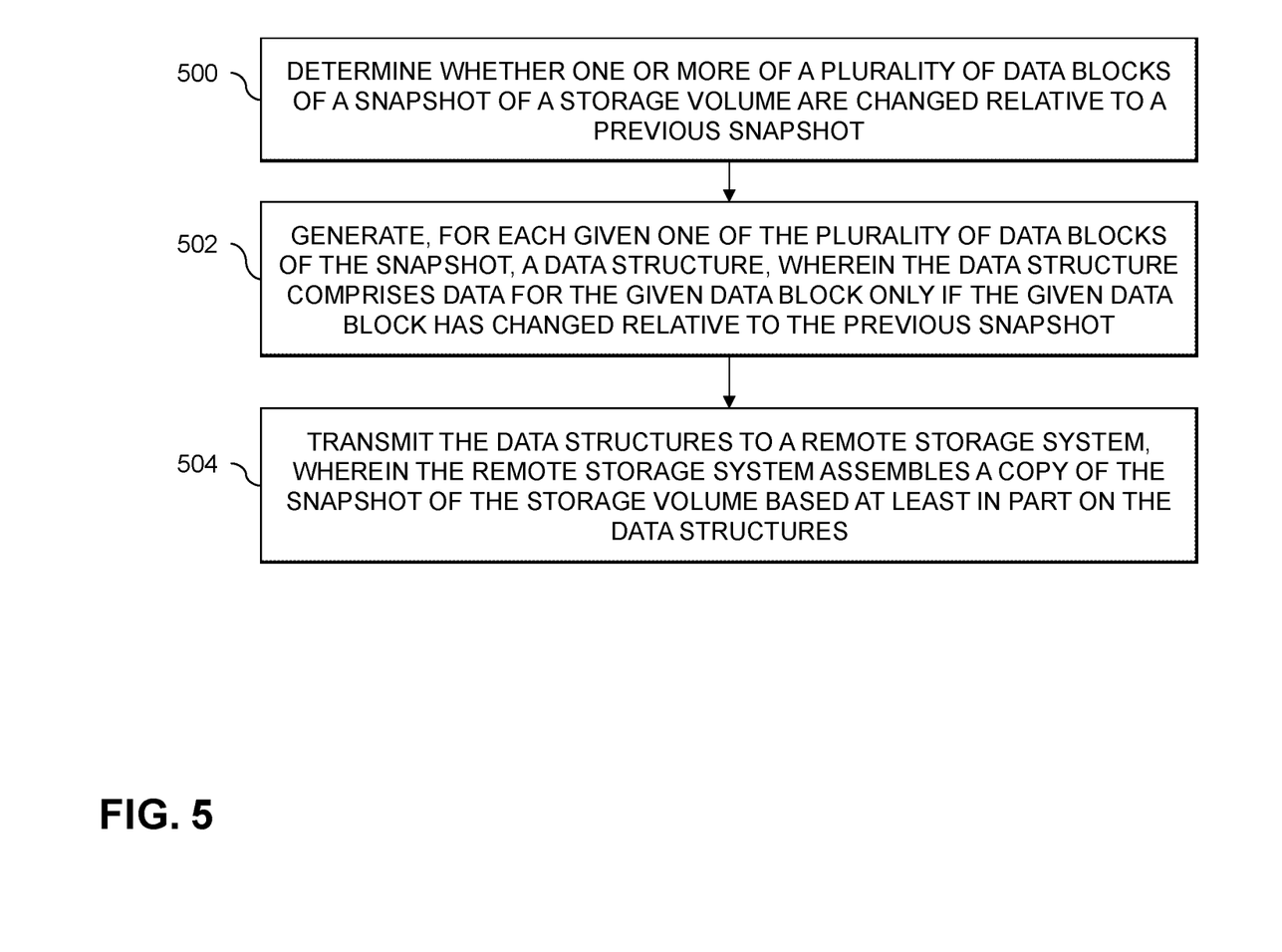
FIG. 5 is a flow diagram of a differential snapshot process in an illustrative embodiment.

FIG. 5 shows an example of a process for differential snapshots in illustrative embodiments. It is to be understood that this particular process is only an example, and additional or alternative processes can be carried out in other embodiments.

In this embodiment, the process includes steps 500 through 504. These steps are assumed to be performed by the first storage system 102 utilizing its snapshot management logic 120.

Step 500 includes determining whether one or more of a plurality of data blocks in a first snapshot of a storage volume have changed relative to a plurality of data blocks in a second snapshot of the storage volume. Step 502 includes generating a respective data structure for each of the plurality of data blocks in the first snapshot, wherein the data structure comprises data content of the corresponding data block of the first snapshot only if the corresponding data block has changed relative to the second snapshot. Step 504 includes transmitting the data structures to a remote storage system, wherein the remote storage system generates a copy of the first snapshot based at least in part on the data structures.

Step 500 may further include computing a first set of hash values based on the plurality of data blocks in the first snapshot; and comparing the first set of hash values to a second set of hash values previously computed based on the plurality of data blocks in the second snapshot. The process depicted in FIG. 5 may further include the step of generating an output file comprising the first set of hash values, wherein the output file is stored separately from the data content of the plurality of data blocks in the first snapshot. The comparing the first set of hash values to a second set of hash values may include determining that a given hash value in the first set is equal to a corresponding hash value in the second set; and obtaining the data block associated with the given hash value from the first snapshot and the data block associated with the corresponding hash value from the second snapshot to determine whether the data block has changed. The first set of hash values and the second set of hash values may be computed using a secure hash algorithm. Each of the data structures may include at least one of: a data array field; a length field; an offset field; and a hash field. Step 502 may include, in response to determining that a given one of the data blocks in the first snapshot has not changed relative to the second snapshot, setting the length field of the data structure to indicate to the remote system that no data content is being transmitted. Step 504 may further include at least one of: encrypting at least a portion of each of the generated data structures; and compressing at least a portion of each of the generated data structures. The second snapshot may be generated at an earlier time than the first snapshot. The copy of the first snapshot may be generated by the remote storage system further based on a copy of the second snapshot stored on the remote storage system and the transmitted data structures.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional snapshot approaches. For example, some embodiments are configured to improve the efficiency of transferring snapshots to a remote location by reducing the amount of data that needs to be read at the sending side and/or reducing the number of network resources needed to send the data necessary to assemble a copy of a snapshot at the remote location. These and other embodiments can effectively improve the efficiency of differential snapshot techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for differential snapshots will now be described in greater detail with reference to FIGS. 6 and 7. Although described in the context of system 100, these platforms may also be used to implement at least portions of other information processing systems in other embodiments.

Figure 6:
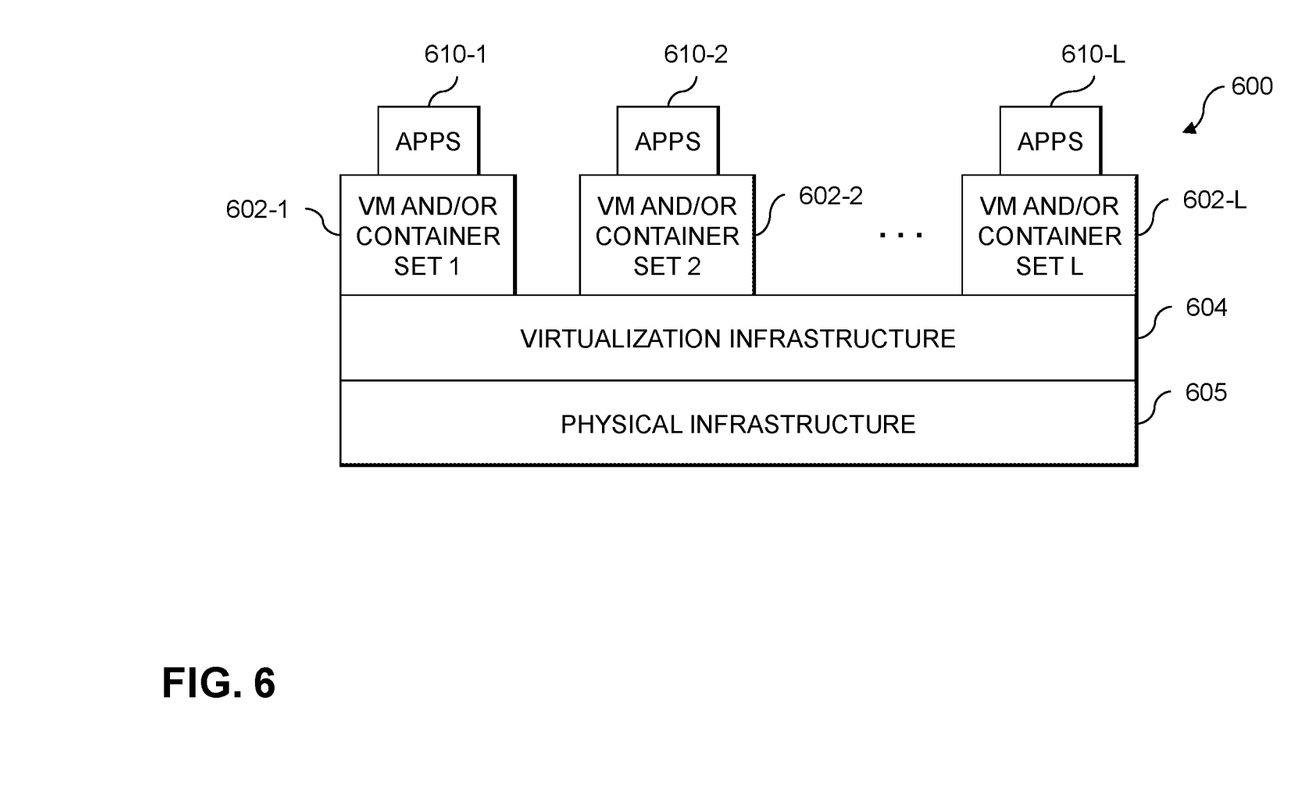
FIGS. 6 and 7 show examples of processing platforms that may be utilized to implement at least a portion of an information processing system in illustrative embodiments.
Figure 7:
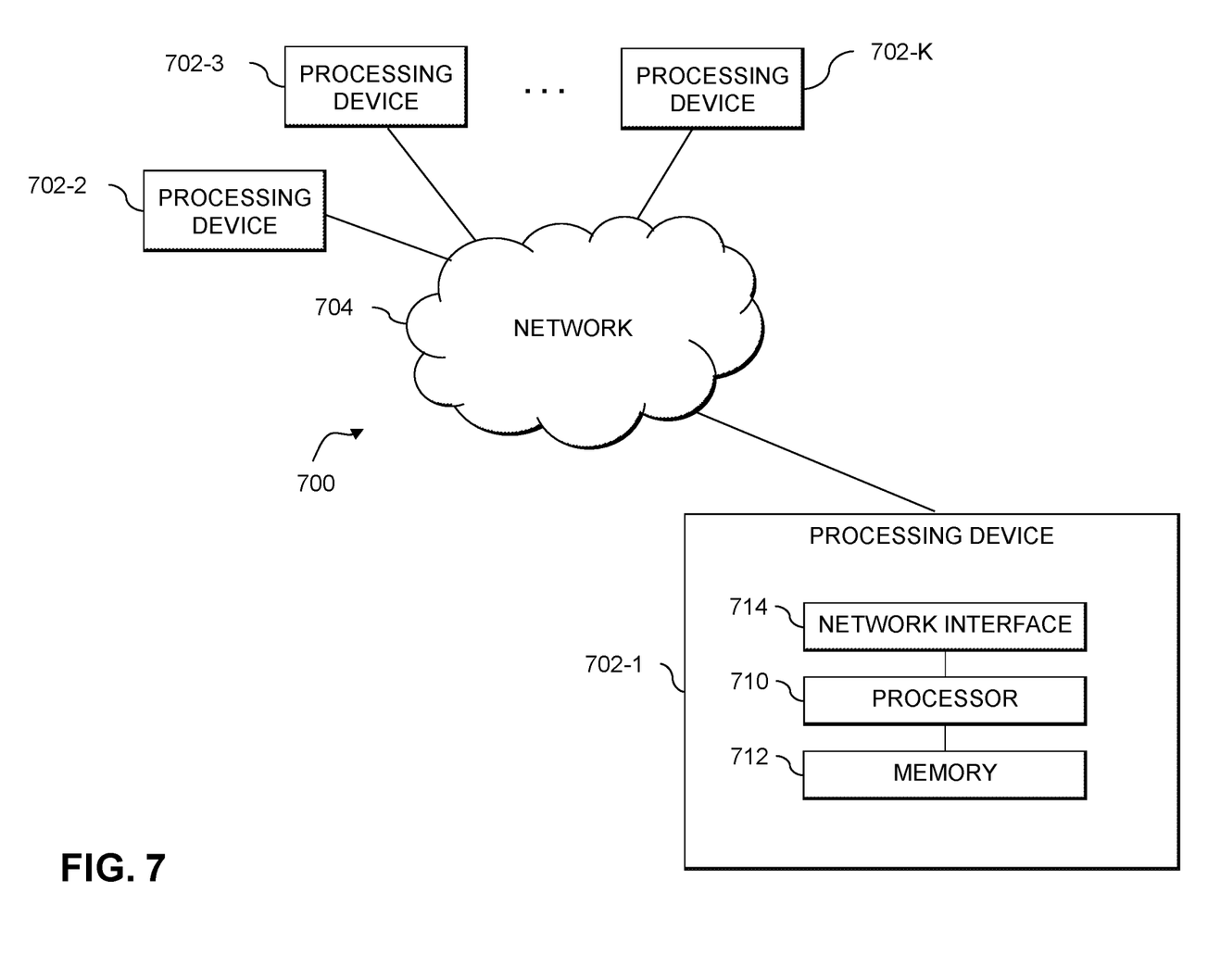

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for differential snapshots of the type described above using one or more processes running on a given one of the VMs. For example, each of the VMs can implement snapshot management logic 120 and/or other components for implementing functionality for differential snapshots in the first storage system 102.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality for differential snapshots in a storage system of the type described above. For example, a container host device supporting multiple containers of one or more container sets can implement one or more instances of the snapshot management logic 120, and/or other components for implementing functionality for differential snapshots in the first storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for differential snapshots of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    determining whether one or more of a plurality of data blocks in a first snapshot of a storage volume have changed relative to a plurality of data blocks in a second snapshot of the storage volume, wherein the determining comprises: computing a first set of hash values based on the plurality of data blocks in the first snapshot; and comparing the first set of hash values to a second set of hash values previously computed based on the plurality of data blocks in the second snapshot, wherein the second set of hash values is stored in an output file that is generated by a first storage system when transmitting data structures corresponding to at least some of the plurality of data blocks in the second snapshot to a remote storage system;
    generating a respective further data structure for each of the plurality of data blocks in the first snapshot, wherein each of the further data structures comprises a data array field, and wherein the data array field comprises data content of the corresponding data block of the first snapshot only if the corresponding data block has changed relative to the second snapshot; and
    transmitting the further data structures to the remote storage system, wherein the remote storage system generates a copy of the first snapshot based at least in part on the further data structures;
    wherein the method is performed by at least one processing device comprising a processor coupled to a memory.

2. The computer-implemented method of claim 1, further comprising:
    storing the output file at the first storage system separately from the data content of the plurality of data blocks in the first snapshot and the plurality of data blocks in the second snapshot.

3. The computer-implemented method of claim 1, wherein said comparing comprises:
    determining that a given hash value in the first set is equal to a corresponding hash value in the second set; and
    obtaining a first data block associated with the given hash value from the first snapshot and a second data block associated with the corresponding hash value from the second snapshot to determine whether the first data block has changed.

4. The computer-implemented method of claim 1, wherein the first set of hash values and the second set of hash values are computed using a secure hash algorithm.

5. The computer-implemented method of claim 1, wherein each of the further data structures further comprises at least one of:
    a length field;
    an offset field; and
    a hash field.

6. The computer-implemented method of claim 5, wherein said generating comprises:
    in response to determining that a given one of the data blocks in the first snapshot has not changed relative to the second snapshot, setting the length field of the corresponding further data structure to indicate to the remote storage system that no data content is being transmitted.

7. The computer-implemented method of claim 1, wherein said transmitting comprises at least one of:
    encrypting at least a portion of each of the generated further data structures; and
    compressing at least a portion of each of the generated further data structures.

8. The computer-implemented method of claim 1, wherein the second snapshot is generated at an earlier time than the first snapshot.

9. The computer-implemented method of claim 1, wherein the copy of the first snapshot is generated by the remote storage system further based on a copy of the second snapshot stored on the remote storage system and the transmitted further data structures.

10. A non-transitory processor-readable storage medium having stored therein program code of one or more software programs, wherein the program code when executed by at least one processing device causes the at least one processing device:

to determine whether one or more of a plurality of data blocks in a first snapshot of a storage volume have changed relative to a plurality of data blocks in a second snapshot of the storage volume, wherein the determining comprises: computing a first set of hash values based on the plurality of data blocks in the first snapshot; and comparing the first set of hash values to a second set of hash values previously computed based on the plurality of data blocks in the second snapshot, wherein the second set of hash values is stored in an output file that is generated by a first storage system when transmitting data structures corresponding to at least some of the plurality of data blocks in the second snapshot to a remote storage system;

to generate a respective further data structure for each of the plurality of data blocks in the first snapshot, wherein each of the further data structures comprises a data array field, and wherein the data array field comprises data content of the corresponding data block of the first snapshot only if the corresponding data block has changed relative to the second snapshot; and to transmit the further data structures to the remote storage system, wherein the remote storage system generates a copy of the first snapshot based at least in part on the further data structures.

11. The non-transitory processor-readable storage medium of claim 10, wherein the program code when executed by the at least one processing device causes the at least one processing device:

to store the output file at the first storage system separately from the data content of the plurality of data blocks in the first snapshot and the plurality of data blocks in the second snapshot.

12. The non-transitory processor-readable storage medium of claim 10, wherein said comparing comprises:

determining that a given hash value in the first set is equal to a corresponding hash value in the second set; and obtaining a first data block associated with the given hash value from the first snapshot and a second data block associated with the corresponding hash value from the second snapshot to determine whether the first data block has changed.

13. The non-transitory processor-readable storage medium of claim 10, wherein the first set of hash values and the second set of hash values are computed using a secure hash algorithm.

14. The non-transitory processor-readable storage medium of claim 10, wherein each of the further data structures further comprises at least one of:

a length field;
an offset field; and
a hash field.

15. The non-transitory processor-readable storage medium of claim 14, wherein said generating comprises:

in response to determining that a given one of the data blocks in the first snapshot has not changed relative to the second snapshot, setting the length field of the corresponding further data structure to indicate to the remote storage system that no data content is being transmitted.

16. An apparatus comprising:

at least one processing device comprising a processor coupled to a memory;

the at least one processing device being configured:

to determine whether one or more of a plurality of data blocks in a first snapshot of a storage volume have changed relative to a plurality of data blocks in a second snapshot of the storage volume, wherein the determining comprises: computing a first set of hash values based on the plurality of data blocks in the first snapshot; and comparing the first set of hash values to a second set of hash values previously computed based on the plurality of data blocks in the second snapshot, wherein the second set of hash values is stored in an output file that is generated by a first storage system when transmitting data structures corresponding to at least some of the plurality of data blocks in the second snapshot to a remote storage system;

to generate a respective further data structure for each of the plurality of data blocks in the first snapshot, wherein each of the further data structures comprises a data array field, and wherein the data array field comprises data content of the corresponding data block of the first snapshot only if the corresponding data block has changed relative to the second snapshot; and to transmit the further data structures to the remote storage system, wherein the remote storage system generates a copy of the first snapshot based at least in part on the further data structures.

17. The apparatus of claim 16, wherein the at least one processing device is further configured:

to store the output file at the first storage system separately from the data content of the plurality of data blocks in the first snapshot and the plurality of data blocks in the second snapshot.

18. The apparatus of claim 17, wherein said comparing comprises:

determining that a given hash value in the first set is equal to a corresponding hash value in the second set; and obtaining a first data block associated with the given hash value from the first snapshot and a second data block associated with the corresponding hash value from the second snapshot to determine whether the first data block has changed.

19. The apparatus of claim 17, wherein the first set of hash values and the second set of hash values are computed using a secure hash algorithm.

20. The apparatus of claim 16, wherein each of the further data structures further comprises at least one of:

a length field;
an offset field; and
a hash field.

* * * * *